Aug. 13, 1957 R. B. JOHNSON 2,802,414
WIRE PRINTER
Filed Oct. 13, 1954 6 Sheets-Sheet 1

INVENTOR.
REYNOLD B. JOHNSON
BY
*Joseph B. Taphorn*
ATTORNEY

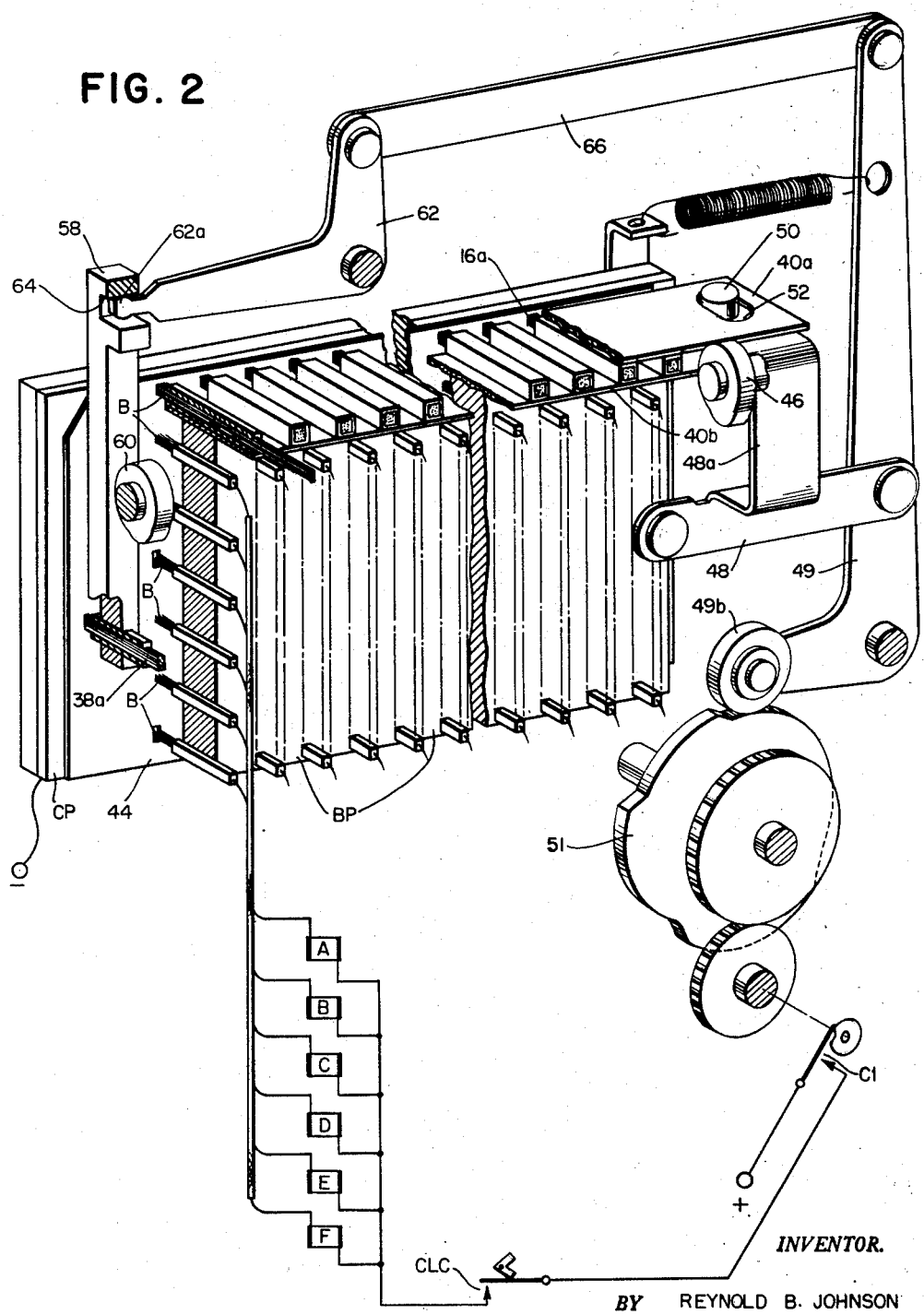

Aug. 13, 1957  R. B. JOHNSON  2,802,414
WIRE PRINTER
Filed Oct. 13, 1954  6 Sheets-Sheet 3

INVENTOR.
REYNOLD B. JOHNSON
BY Joseph B. Taphorn
ATTORNEY

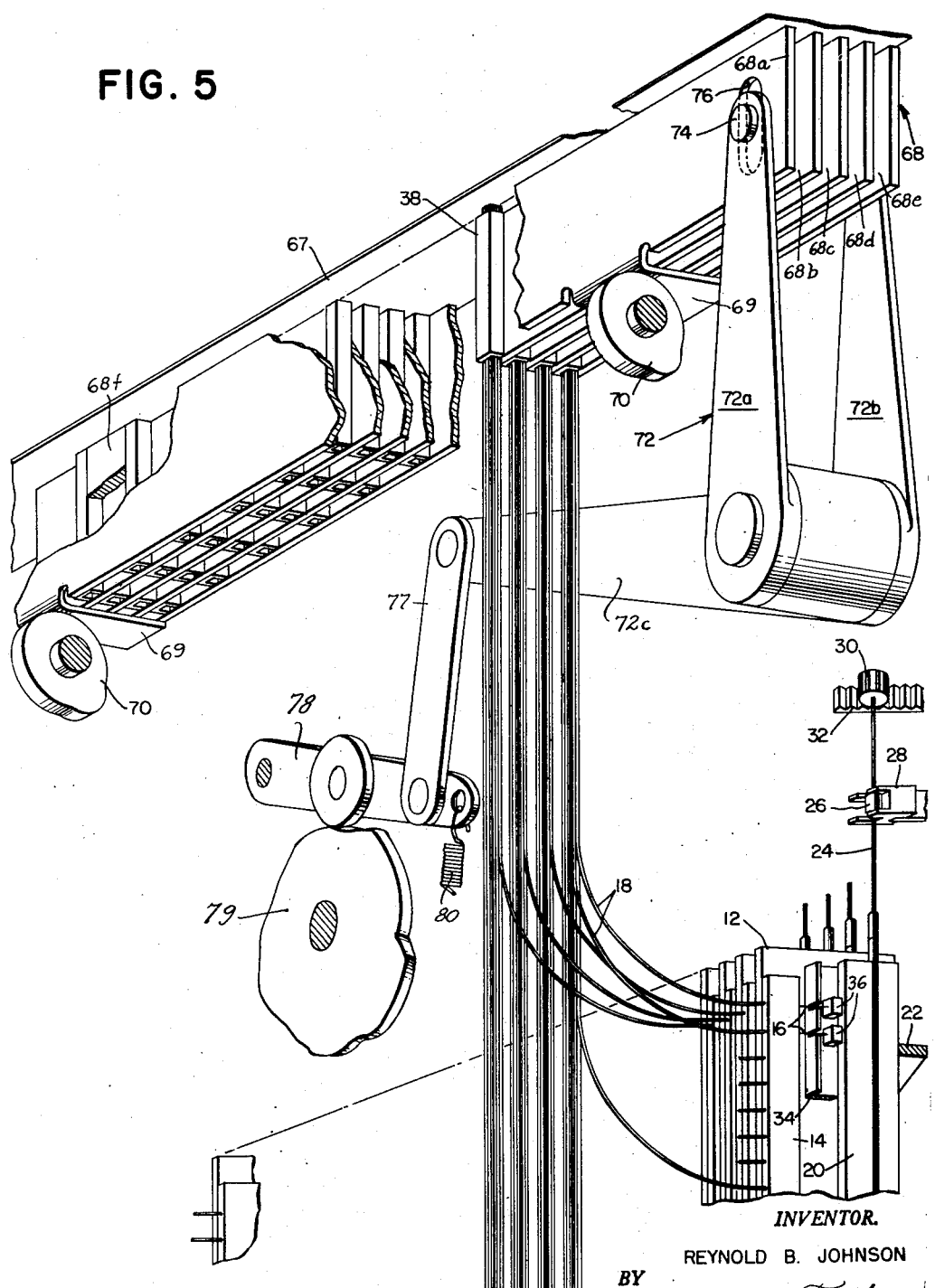

Aug. 13, 1957 — R. B. JOHNSON — 2,802,414
WIRE PRINTER

Filed Oct. 13, 1954 — 6 Sheets-Sheet 6

INVENTOR.
REYNOLD B. JOHNSON
BY Joseph B. Taphorn
ATTORNEY

2,802,414
WIRE PRINTER

Reynold B. Johnson, Palo Alto, Calif., assignor to International Business Machines Corporation, New York, N. Y., a corporation of New York Application October 13, 1954, Serial No. 462,001

15 Claims. (Cl. 101—93)

This invention relates to printers and more particularly to printers embodying wire printing mechanisms wherein the clustered ends of print wires are moved against recording material.

Wire printing mechanisms of the type employed are disclosed in the U. S. patent application, No. 384,697, of Reynold B. Johnson, filed October 7, 1953. In that wire printing mechanism, the clustered print ends of preset print wires, mounted in curved flexible tubes, are moved against a recording material backed up by a platen by a print head to which the ends of the curved tubes are affixed adjacent the protruding print ends. Such a wire printing mechanism rapidly prints single characters of high uniformity and clarity.

An object of this invention is to provide an economical apparatus which can rapidly print large numbers of characters of high uniformity and clarity.

Another object of the invention is to provide such an apparatus also capable of effecting simultaneous duplicate printing at separate points.

Still another object of the invention is to provide such an apparatus also capable of simultaneously effecting multi-line address printing.

According to the invention a number of wire printing mechanisms of the general type disclosed in the above identified application are advantageously associated to effect simultaneously parallel and serial printing. Parallel and serial printing may be carried out because the movable print heads of wire printing mechanisms may also be adjusted laterally. Thus, the print heads are mounted in equally spaced in-line relation to each other upon a bail. This bail is movable towards and away from a platen to cause the print heads to undergo simultaneously a printing stroke. To effect printing in the character positions between the print heads, the bail is adjusted in the line of the print heads in small increments equal to the spacing between adjacent characters. Through a series of such adjustments and printing strokes, a complete line of printing is rapidly effected by small, economical number of wire printing mechanisms. Any well known way may be utilized to present sequentially the different characters to each wire printing mechanism.

Duplicate printing of characters printed on a line can be readily effected at a point remote from the line by additional wire printing mechanism. This obtains because the flexible tubes and print wires extending from the print heads enable the code rods to be juxtaposed so that their set-up mechanism may be operated as one unit. The corresponding print heads will thus effect the printing of the same character at two displaced points.

For effecting a multi-line address printing, a plurality of lines of equally spaced print heads of corresponding wire printing mechanisms are employed. Print heads for succeeding lines are mounted underneath print heads for first line so that when the print head bail has been stepped laterally through all of the adjacent positions, the full and complete address has been printed.

Other objects of the invention will be pointed out in the following description and claims and illustrated in the accompanying drawings, which disclose, by way of examples, the principle of the invention and the best mode which has been contemplated of applying that principle.

Figs. 2a, 2b, 2c, and 2d respectively disclose the printed condition of a card between successive print strokes.

Figure 1:
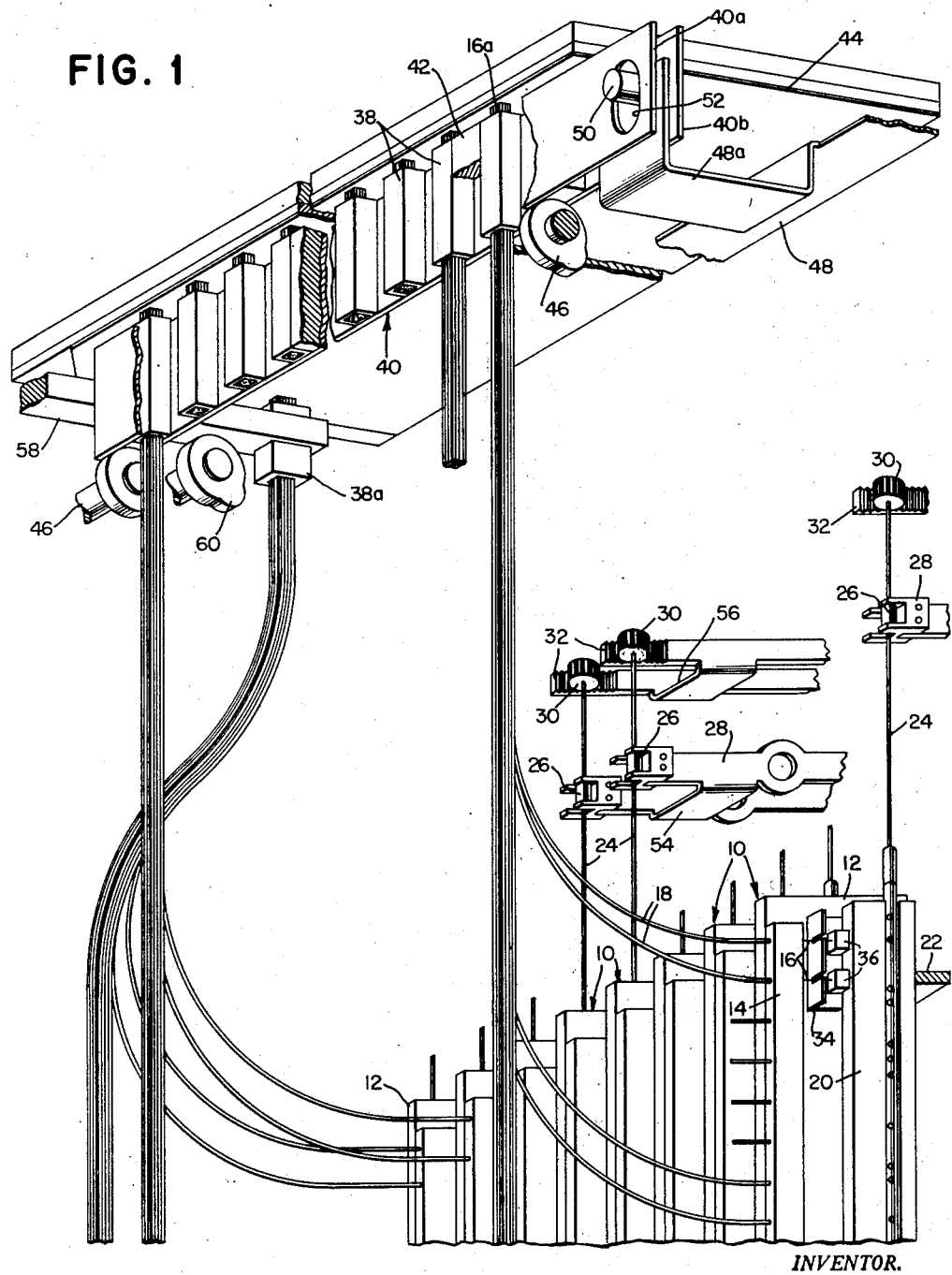
Fig. 1 is a diagrammatic view showing one embodiment of the invention.
Figure 2A:
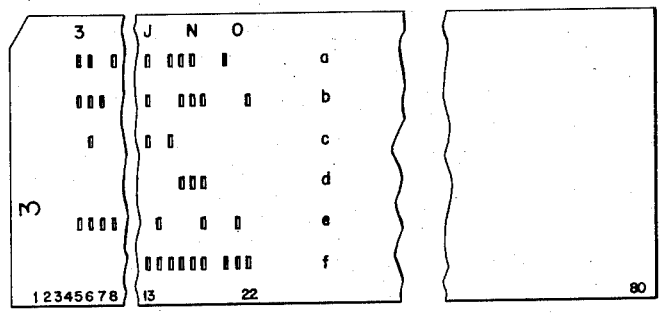
Fig. 2 is a schematic detail view of apparatus for operating the embodiment of Fig. 1.
Figure 2B:
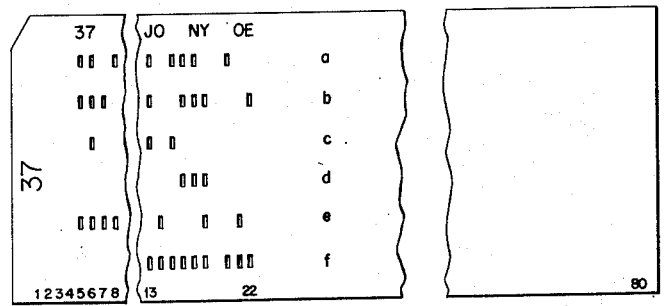
Figure 2C:
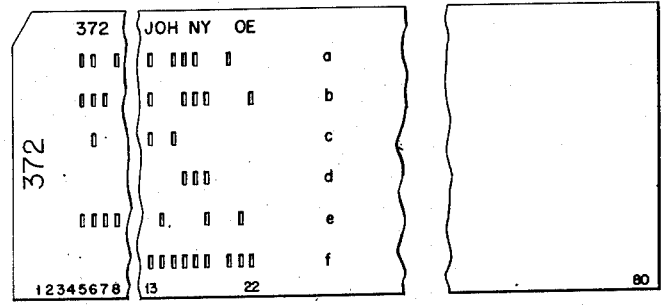
Figure 2D:
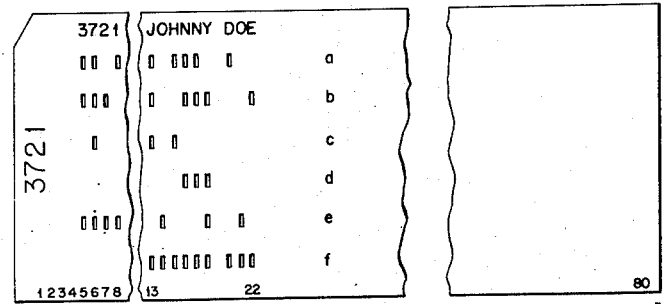
Figure 3:
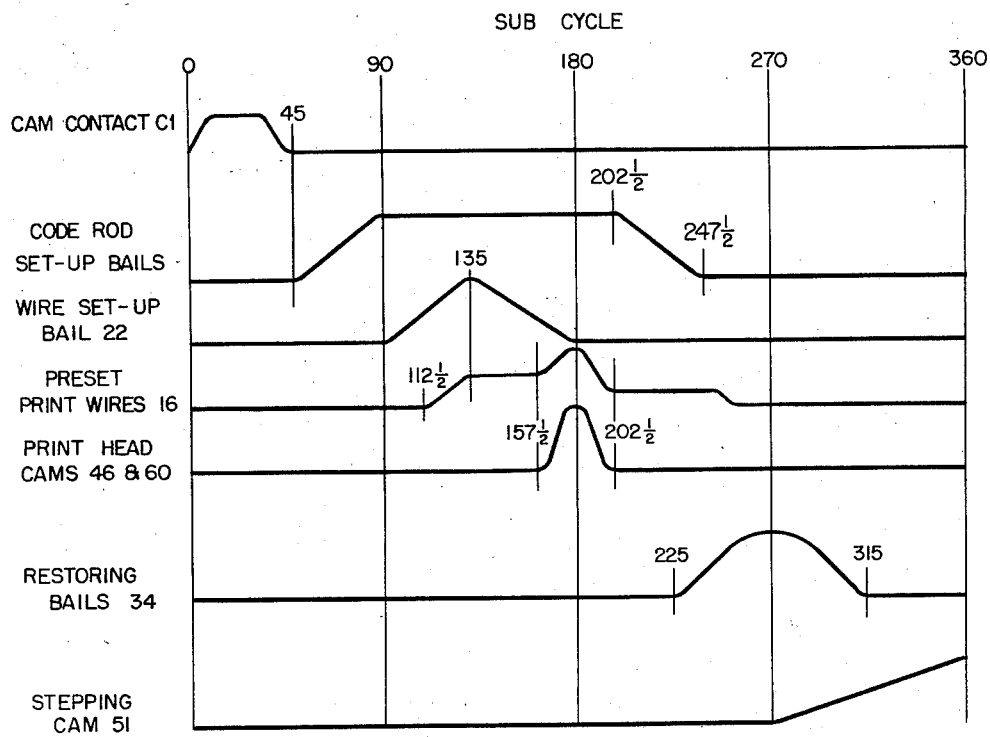

Fig. 3 is a subcycle chart depicting the timing of the wire printing mechanism elements of the Figs. 1 and 2 embodiment.

Figure 4:
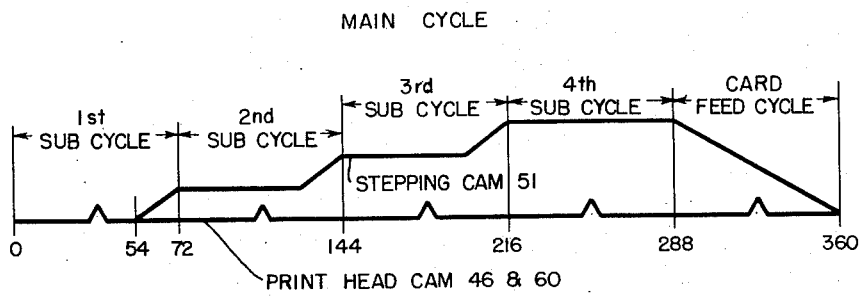

Fig. 4 is a chart depicting the main cycle of the apparatus.

Fig. 5 is a diagrammatic view showing an embodiment of the invention as employed for multi-line address printing.

Figs. 6a, 6b, 6c, and 6d respectively disclose the printed condition of a mailing label between successive print strokes by the multi-line address printing embodiment of Fig. 5.

Referring more particularly to Fig. 1, the invention is shown therein as being embodied for use in an interpreter. In such an interpreter, data recorded as perforations on a card are sensed and thereafter printed on the same card for easy reading. Conventionally, the printing is effected in a line along a long edge of the card. In addition, other data such as an identifying number is often printed in bold form across the end of the card for easy recognition when the card resides upright in a vertical slot.

The wire printing mechanisms are shown as having their wire setting mechanisms, generally indicated by the numeral 10, arranged in a bank. Each wire setting mechanism is shown as being supported upon a base 12 which is provided with a guide member 14 through which the print wires 16 extend and to which the flexible tubes 18 for guiding the individual print wires are attached. The print wires extend from the guide member and into a housing 20 carried by a reciprocable common support element or bail 22. The housing 20 mounts the vertically extending code rod 24, which is adjustable up and down through a collet 26 fixed to it by a forked lever 28 and rotatable to different positions through a gear 30 fixed to it by a rack 32. After the code rod 24 is positioned, the housing 20 is reciprocated so that the code rod moves against the end of the pre-aligned print wires to preset them by selective longitudinal displacement. The pre-aligning is effected by a bail 34 slotted to receive the print wires and located between the guide member 14 and the housing 20 where it acts upon inertia slugs 36 affixed to the respective print wires.

From the wire set-up mechanism the guide tubes 18 and encompassed print wires 16 of each wire printing mechanism extend in broad sweeping curves to where they are gathered together to form a cable. The cable terminates at its upper end in print head 38 to which the respective tubes are rigidly attached. The print ends 16a of the print wires, however, extend out of the tubes and beyond the upper end of the print head as well as above the upper edge of a bail 40 to which the print heads are rigidly attached.

The bail is formed of a pair of spaced vertical plates 40a and 40b rigidly interconnected by spacer bars 42 and between which the print heads 38 are mounted. It is supported so that normally the print ends 16a of the print wires are in spaced relationship to a platen-backed recording material, such as the card 44 shown, by a pair of synchronously rotatable single-lobed cams 46. These cams are operated in synchronism with the wire set-up mechanisms 10 and so that the lobes on the cams move against the bail after the print wires have been preset to impart a printing stroke to the print head.

The adjustment of the bail to effect printing in the card spaces between the normal positions of the print heads is effected through an arm 48a carried by a link 48. The upwardly extending portion of the arm 48a is received between the plates of the bail 40 and carries a forwardly and rearwardly extending stud 50. This stud is received in aligned vertically-extending slots 52 formed in the bail member plates 40a and 40b. One end of the link 48 is attached to the upstanding arm of a bell crank 49 (Fig. 2). The other or horizontal arm of the bell crank is provided with a roller 49b which rides on the surface of a continuously rotatable cam 51 operative to rotate the bell crank through small increments enabling printing in adjacent positions. It should be observed that the vertical slots 52 in the bail plates permit a printing stroke to take place without effecting the aligned relationship to which the bail has been adjusted.

Duplicate printing is shown as being advantageously utilized for effecting end printing in bold form upon a card. For example, in employee attendance cards the employee number may be recorded along with other data in a line along the long edge of the card and, in addition, along the end of the card where it may be readily recognized in an attendance rack. Duplicate printing of the employee number is obtained by providing a common set-up mechanism for code rods 24 of respective print mechanisms. Thus the levers 28 for operating on the collets 26 on the respective code rods may be interconnected by an element 54 for uniform up and down movement while the racks 32 meshing with gears 30 on the upper ends of the respective code rods may be interconnected by an element 56 for uniform rotational movement. Only one positioning mechanism would be needed for these racks and levers. Thus, the same setting would be applied at all times to the print wires of the respective wire printing mechanisms.

The print head of the wire printing mechanism for effecting end printing may be supported by a separate bail 58, though it may be supported by a bail formed integral with the bail 40. As shown, the bail 58 is provided with an aperture in which an enlarged print head 38a is mounted. The bail may rest upon a single-lobed cam 60 which is rotatable synchronously with the cams 46 for the bail 40. A bell crank 62 (Fig. 2) has the end of one lever formed with ball 62a which is received in a slot 64 formed in the bail 58. The other lever of the bell crank is connected by a link 66 to the bell crank 49. Thus, adjustment of this bell crank 62 is effected simultaneously with the adjustment of the link 48, and it can be seen that the bail 58 would thus be operated in the same fashion as the bail 40 to effect serial printing.

The operation of the arrangement shown in Fig. 1 may be effected as follows: In an interpreter, a number of spaced columns of index point positions on the card 44 may be sensed simultaneously by columns of brushes B (Fig. 2) on a shiftable brush plate BP and electrically connected to the adding linkage latch tripping magnets such as A, B, C, D, E, and F of the respective wire setting mechanisms. Circuits from a contact plate CP underlying the card and also constituting the platen are completed through magnets for corresponding card perforations at the start of each printing of subcycle by the closing of cam contacts C1. This may be completed by 45° of subcycle time (Fig. 3). The code rod set-up bails (not shown) may then be operated upon the respective tripped magnet latches to impart rotational and translational displacement to the respective code rods 24 as in the above identified patent application. Code rod movement may be completed by 90° of subcycle time; at this time the wire setting bail 22 is operated to move the housings 20 so that the code rods move against the print wires 16 of the respective wire printing mechanisms. The print wires to be preset may be displaced by 135°, after which the housings 20 restore. The print heads then undergo a printing stroke from 157½° to 202½° subcycle time under the action of the cams 46 and 60. Thereafter the code rods and their set-up bails may be restored. At 225°, the bails 34 move toward the housings 20 to engage the inertia slugs 36 of the preset print wires and fully restore them to realigned condition. At 270° of subcycle time a stepped cam 51, which completes one revolution in each main cycle, begins to move the follower roller 49b from the first to the second step. This operates through the bell crank 49 and the links 48 and 66 and bell crank 62 so that the print heads 38 and 38a are adjusted to the next adjacent character positions. Concurrently therewith, the cam 51 adjusts the brush plate BP so that the brushes B will sense the next adjacent columns. The following printing or subcycle would automatically ensue.

If the print heads are spaced four character positions apart so that initially only the 1, 5, 9, etc., character positions are printed, it can be seen that each main cycle must comprise four printing cycles and the cam 51 must have four steps. In addition, the main cycle is lengthened to include one additional subcycle to accomplish ejection of the old card and the feeding of a new one. In this manner a large number of cards can be rapidly interpreted.

The printing action obtained from print heads spaced four character positions apart may be clearly seen by considering Figs. 2a, 2b, 2c, and 2d. Assume that card columns 5, 6, 7, and 8 have an employee number 3721 while card columns 13 through 22 have the fictitious employee name Johnny Doe punched therein according to the code disclosed in the U. S. patent application Serial No. 255,391, filed November 8, 1951, now U. S. Patent No. 2,730,040, and referred to in the U. S. application mentioned earlier herein. In the first subcycle, characters punched in columns 5, 13, 17, and 21, specifically 3, J, the second N, and O could be printed as shown in Fig. 2a. The numeral 3 would not only be printed along the long edge of the card but also in bold type across the end thereof by the print head 38a. In the second subcycle, the characters punched in columns 6, 14, 18, and 22 would be printed in the fashion described. At the end of this subcycle, the printed matter would appear on the card as in Fig. 2b. In subcycles 3 and 4, the characters in columns 7, 15, and 19 and columns 8, 16, and 20, respectively, would be printed, the printed condition of the card appearing as in Figs. 2c and 2d. It should be evident that the serial parallel printing nature of the instant invention produces a line of legible matter in each main cycle.

In Fig. 5 there is disclosed a four-line address label printing arrangement. In such an arrangement the labels are preferably joined end to end to form a tape 67, and this tape would be moved in increments to present successive labels to the printing mechanism. Any suitable mechanism (not shown) may be employed to effect such tape feeding.

The wire set-up mechanisms for the wire printing mechanisms employed are the same and are mounted in a bank as in Fig. 1. However, in between the wire set-up mechanisms for successive print heads on the same line may be interspersed the wire setting mechanisms for the wire printing mechanisms for printing underlying characters on the other lines of the address. Thus, in a four-line address printing machine, the wire setting mechanism for the print heads for printing underlying characters on the second, third, and fourth lines would be mounted in that order alongside the wire setting mechanism for the print head in the first line. With such arrangement the print wire tubes converge to the cables for the respective print heads in successive orders so as to eliminate any interference therebetween.

The print heads 38 for a four-line address printer may be mounted in a bail 68 having five rigidly interconnected plates 68a, 68b, 68c, 68d, and 68e—those print heads for a given line being mounted between the same pair of plates for example, 68a and 68b, while those for the underlying characters are mounted directly underneath between adjacent plates 68b and 68c, 68c and 68d and 68e. Blocks 68f may serve to space and rigidly interconnect the bail plates and print heads. The bail may be supported through crossover straps 69 upon a pair of cams 70 to effect printing strokes. A bell crank 72 for operating this bail may consist of two upstanding arms 72a and 72b which are interconnected by a pin 74 slidably received in vertically extending openings 76 formed in each of the bail plates. The other or horizontal arm 72c of the bell crank may be connected through a link 77 to a cam follower 78 held against a stepped cam 79 (like the stepped cam 51 earlier described) by a spring 80. Printing strokes may be effected by the cams 70 in the usual way without disturbing the setting of the bail while the bell crank may be adjusted to each of the character positions between the adjacent print heads.

The operation of the mechanism described in Fig. 5 is substantially like that for the mechanism disclosed in Fig. 1. Instead of feeding a new card to the print heads after each complete printing, the tape 67 is adjusted endwise to dispose a new label opposite the print heads. As before, data would be serially presented to the various wire printing mechanisms from whatever constituted the source of the data. For example, such addresses could be obtained from successive record cards or from magnetic tapes or drums.

The manner of printing four line addresses on a label is shown in Figs. 6a, 6b, 6c, and 6d. Assuming a fictitious name and address of

Figure 6A:
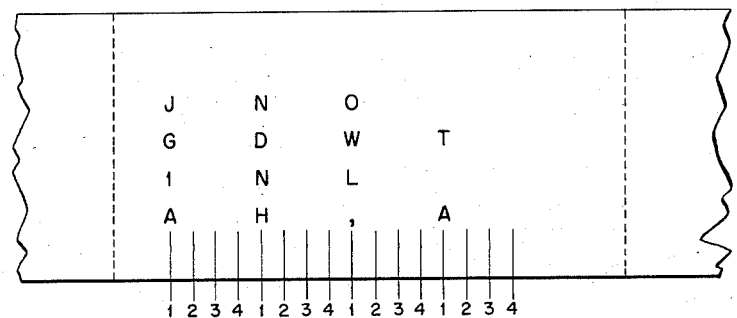
Figure 6B:
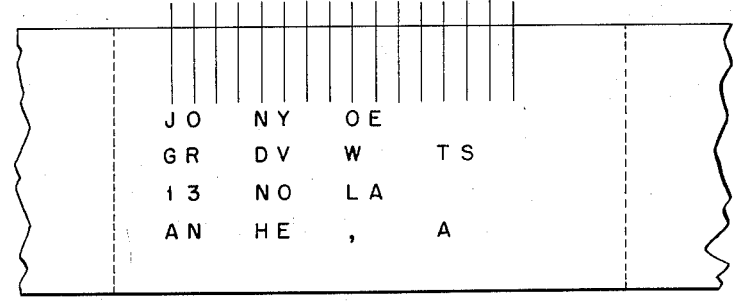
Figure 6C:
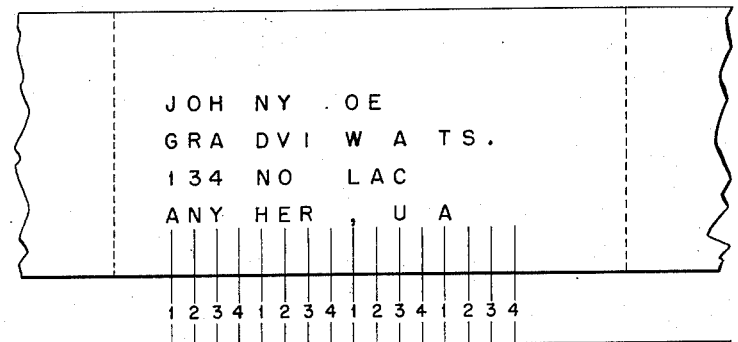
Figure 6D:
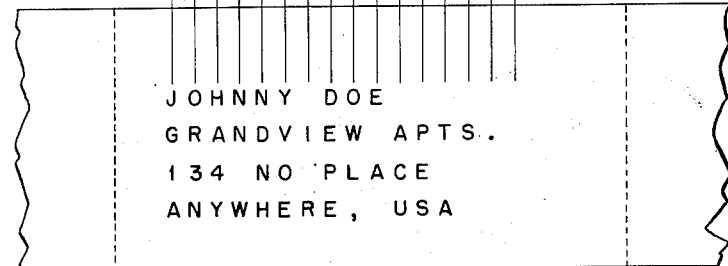

JOHNNY DOE
GRANDVIEW APTS.
134 NO PLACE
ANYWHERE, USA there would be printed in the first subcycle the letters J, N, and O by the first line of print heads, the letters G, D, W, and T by the second line of print heads, the characters 1, N, and L by the third line of print heads, and the characters A, H, the comma, and A by the fourth line of print heads, and the label would be made to appear as in Fig. 6a. In the second subcycle, the characters O, Y, and E would be added to the first line, R, V, and S to the second line, while 3, O, and A and N and E, respectively, were added to the third and fourth lines. The label now appears as in Fig. 6b. In the third subcycle, the characters H; A, 1, A, and the period; 4 and C; and Y, R, and U are added respectively to the first, second, third, and fourth lines as is shown in Fig. 6c. Lines 1, 2, 3, and 4 respectively receive the characters N and D; N, E, and P; P and E; and W, E, and S in the fourth subcycle. The label is now completely printed as may be seen by reference to Fig. 6d.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a printer, a plurality of wire printing mechanisms each comprising a plurality of print wires gathered at one end in a cluster and displaceable endwise to effect a printing stroke, means for supporting said clusters of wires adjacent recording material and so that they are spaced at least one character position from each other, and means for moving said supporting means laterally of said recording material to enable successive printing by the respective clusters in adjacent character positions.

2. In a printer, a plurality of wire printing mechanisms each comprising a plurality of print wires gathered at one end in a cluster and displaceable endwise to effect a printing stroke, means for carrying said clusters of wires so that they are spaced at least one character position from each other, means for moving said carrying means towards and away from a recording material to effect printing strokes, and means for moving said carrying means laterally to enable each of said clusters to effect successive printing in adjacent character positions.

3. In a printer, a plurality of wire printing mechanisms each comprising a plurality of print wires controlled at one end by a setting mechanism and gathered together in a cluster at their other end, first means for supporting the wire setting mechanisms, second means for carrying said print wire clusters so that they are spaced at least one character position from each other, third means for moving said second means towards and away from a recording material to cause the other ends of print wires to undergo a printing stroke, and means for shifting said second means laterally to enable each of said wire clusters to effect successive printing in adjacent character positions.

4. In a printer, a plurality of wire printing mechanisms each comprising a plurality of print wires controlled by a setting mechanism and guided to a print head with which they are movable, first means for supporting the wire setting mechanisms, second means for carrying said print heads so that they are spaced at least one character position from each other, third means for moving said second means towards and away from recording material to cause the print heads to undergo a printing, and means for shifting said second means laterally to enable each of said print heads to effect successive printing in adjacent character positions.

5. In a printer, a plurality of wire printing mechanisms each comprising a plurality of print wires controlled by a setting mechanism and guided in flexible tubes extending in broad sweeping curves to a print head to which the tubes are attached, first means for supporting the wire setting mechanisms, second means for carrying said print heads so that they are spaced at least one character position from each other, third means for moving said second means towards and away from recording material to cause the print heads to undergo a printing stroke, and means for adjusting said second means laterally to enable each of said print heads to effect printing in adjacent character positions.

6. In a printer, a plurality of wire printing mechanisms each comprising a plurality of print wires controlled by a setting mechanism and guided in flexible tubes extending in broad sweeping curves to a print head to which the tubes are attached, first means for supporting the wire setting mechanisms, second means carrying the print heads in a line and so that they are spaced at least one character position from each other, means for moving said second means towards and away from a recording material so as to impart to said print heads printing strokes, and means for adjusting the second means laterally after each printing stroke to enable printings in successive line character positions by each print head.

7. In a printer, a plurality of wire printing mechanisms each comprising a plurality of print wires controlled by a setting mechanism and guided in flexible tubes extending in broad sweeping curves to a print head to which the tubes are attached, first means for supporting the wire setting mechanisms in a bank, second means for carrying said print heads in a line and in the same order that the corresponding wire setting mechanisms are mounted in said bank and so that they are spaced at least one character position from each other, third means for moving said second means towards and away from recording material so as to impart to said print heads printing strokes and means for adjusting the second means laterally after each printing stroke to enable printings in successive line character positions by each print head.

8. In a printer, a plurality of wire printing mechanisms each comprising a plurality of print wires controlled by a setting mechanism and guided in flexible tubes extending in broad sweeping curves to a print head to which the tubes are attached, first means for supporting the wire setting mechanisms, second means for carrying the print heads in a line and so that they are spaced at least one character position from each other, third means for moving said second means towards and away from recording material so as to impart to said print heads printing strokes, fourth means for adjusting the second means after each printing stroke to enable printings in successive line character positions by each print head, and means for supplying data successively to each of said wire setting mechanisms.

9. In a printer, a plurality of wire printing mechanisms each comprising print wires controlled by a setting mechanism including code means adjustable to various settings and guided in flexible tubes extending in broad sweeping curves to a print head to which the tubes are attached, the code means for several of said mechanisms being uniformly adjusted, first means for supporting the wire setting mechanisms, second means for carrying the print heads including one of those whose corresponding code means is uniformly adjusted with another in spaced in-line relationship with each other, said second means carrying said print heads so that they are spaced uniformly and at least one character position from each other, third means for carrying the print head corresponding to the another code means, fourth means for moving the second and third means towards and away from recording material so that the print heads thereon undergo printing strokes, and means for adjusting the second and third means to enable the respective print heads thereon to print in successive adjacent character positions.

10. In a printer, a plurality of wire printing mechanisms each comprising print wires controlled by a setting mechanism including a code rod rotatable and translatable to various positions and guided in flexible tubes extending in broad sweeping curves to a print head to which the tubes are attached, the code means for certain of said mechanisms being uniformly rotated and translated, first means for supporting the wire mechanisms, second means for carrying the print heads including one of those whose corresponding code rods is uniformly rotated and translated with another in spaced in-line relationship, said second means carrying said print heads so that they are spaced uniformly and at least one character position from each other, third means for carrying the print head corresponding to the another code rod, fourth means for moving the second and third means so that the print heads thereon undergo printing strokes and means for adjusting the second and third means after each printing stroke to cause the successive printing strokes to effect printing in successive adjacent line character positions.

11. In a multi-line printer, a plurality of wire printing mechanisms each comprising print wires controlled by a setting mechanism and guided in flexible tubes extending in broad sweeping curves to a print head to which the tubes are attached, first means for supporting the wire setting mechanisms, second means for carrying said print heads in a number of in-line relationships in which they are spaced at least one character position from each other, third means for moving said second means towards and away from recording material so that the print heads thereon undergo printing strokes, and means for adjusting the second means after each movement thereof so as to render the print heads effective to print in successive adjacent line character positions.

12. In a multi-line printer, a plurality of wire printing mechanisms each comprising print wires controlled by a setting mechanism and guided in flexible tubes extending in broad sweeping curves to a print head to which the tubes are attached, first means for supporting the wire setting mechanisms in a bank, second means for carrying the print heads in a number of lines in the same order that the corresponding setting mechanisms occur in the bank and so that they are spaced at least one character position from each other, third means for moving said second means towards and away from recording material so that the print heads thereon undergo printing strokes, and means for adjusting the second means in the direction of the lines of print heads so as to render the print heads effective to print in successive adjacent positions in each line.

13. In a multi-line address printer, a plurality of wire printing mechanisms each comprising print wires controlled by a setting mechanism and guided in flexible tubes extending in broad sweeping curves to a print head to which the tubes are attached, first means for supporting the wire setting mechanisms, second means for carrying said print heads so that they are each spaced apart by at least one character position in each of a number of lines, third means for moving said second means towards and away from recording material so that the print heads thereon undergo printing strokes, fourth means for adjusting the second means in the direction of the lines of print heads so as to render each of the print heads effective to print in adjacent character positions in its line, and means for presenting data serially to each of the wire setting mechanisms and parallelly to all of the wire setting mechanisms so as to enable concurrent printing of the whole address.

14. In a printer, a plurality of movable character recording mechanisms, means operable to present serially character indicia to each of said recording mechanisms, and means operable to move said recording mechanisms laterally of a recording material after a character recording is effected by each one to enable successive printing in different character positions.

15. In a printer, a plurality of movable character recording mechanisms capable of concurrently printing characters spaced by at least one character position, means operable to present serially character indicia to each of said recording mechanisms, and means operable to move said recording mechanism laterally of a recording material so that successive printings by each of said recording mechanisms are effected in adjacent character positions.

References Cited in the file of this patent

UNITED STATES PATENTS

| | | |
|---|---|---|
| 1,124,150 | Lilleberg | Jan. 5, 1915 |
| 1,719,176 | Footherap | July 2, 1929 |
| 1,932,914 | Shelton | Oct. 31, 1933 |
| 1,990,415 | Nocken | Feb. 5, 1935 |
| 2,524,127 | Johnson | Oct. 3, 1950 |
| 2,632,386 | Hyland | Mar. 24, 1953 |
| 2,653,534 | Wockenfuss | Sept. 29, 1953 |
| 2,681,614 | Rast | June 22, 1954 |
| 2,683,410 | Wockenfuss | July 13, 1954 |